Sept. 6, 1938.   D. SLOTSKY   2,129,243
BIFOCAL LENS
Filed June 9, 1936
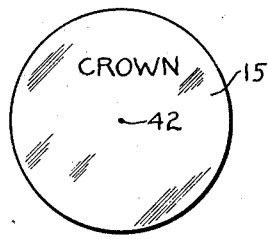
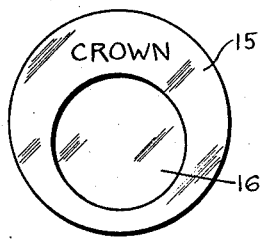
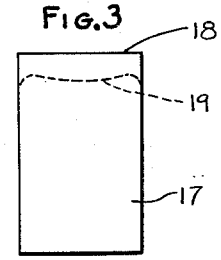
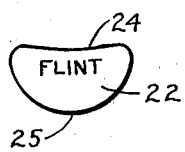
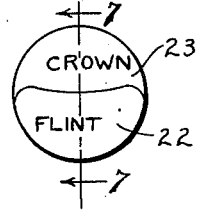
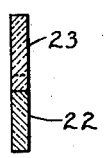
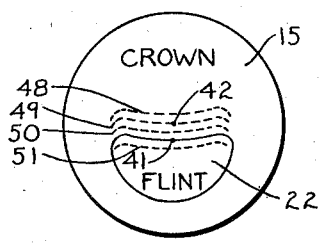
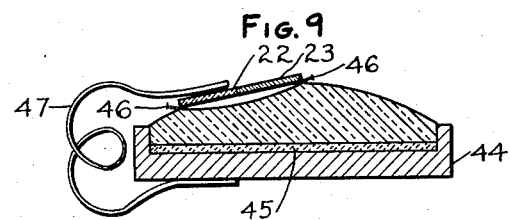
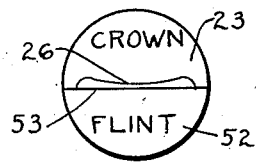
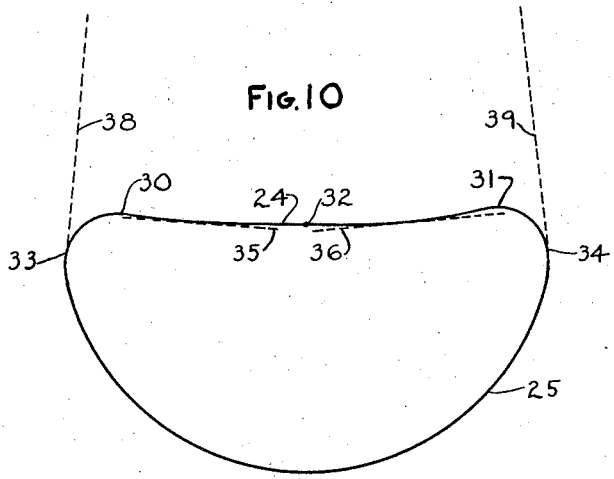
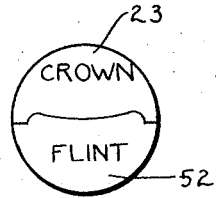
INVENTOR
DAVID SLOTSKY
BY
ATTORNEY Patented Sept. 6, 1938

2,129,243

UNITED STATES PATENT OFFICE 2,129,243

BIFOCAL LENS

David Slotsky, Cleveland, Ohio

Application June 9, 1936, Serial No. 84,321

4 Claims. (Cl. 88—54)

My invention relates in general to lenses and more particularly to bi-focal lenses constructed of dissimilar pieces of glass having different indexes of refraction.

An object of my invention is the provision of a bi-focal lens with a zonal insert having a curved top, which curvature corresponds substantially with the vision defined by the lower lid of the eye.

Another object of my invention is the provision of a zonal insert having a curved top defined by a line having two spaced positive nodal points and an intermediate negative nodal point and having a positive slope as the line extends outwardly in opposite direction from the said negative slope as each end of the line extends to its terminus beyond the two spaced positive nodal points.

Another object of my invention is to make the rate of change of the negative slope of each end of the top line of the zonal insert beyond the said two spaced positive nodal points greater than the rate of change of the positive slope of the top line of the zonal insert intermediate the said two spaced nodal points.

Another object of my invention is to make the intermediate negative nodal point of the top line of the zonal insert substantially coincide with the optical center of the zonal insert.

Another object of my invention is the method of producing a bi-focal lens which comprises making a countersink in a major lens, filling and neutralizing the upper portion of this countersink with a glass or substance similar in refractive power to that of the major lens and filling the lower portion of the said countersink with a glass or substance of different refractive power, so that the line of junction of the different refractive portions defines a line having two spaced positive nodal points and an intermediate negative nodal point with a positive slope as the line extends outwardly in opposite direction from the said intermediate negative nodal point to the two spaced positive nodal points and with a negative slope as each end of said line extends to its terminus beyond the said two spaced positive nodal points.

Another object of my invention is to provide for fusing a piece of flint glass having a straight edge to a piece of crown glass having a curved edge by pressing the two pieces of glass together during the fusing, so as to make the piece of flint glass fit closely to the curved edge of crown glass and make a good weld.

Other objects and a fuller understanding may be had by referring to the following description and claims, taken in conjunction with the accompanying drawing, in which:

Figure 1 represents a plan view of a blank of crown glass;

Figure 2 represents a plan view of a blank of crown glass having a countersink;

Figure 3 represents a plan view of a template that is used in determining the vision defined by the lower lid of the eye;

Figure 4 is a plan view of a zonal insert embodying the features of my invention;

Figure 5 is a plan view of a segmental piece of crown glass having its lower edge adapted to match the upper edge of the zonal insert shown in Figure 4;

Figure 6 is a plan view showing the assembled and fused insert or button.

Figure 7 is a cross sectional view of the assembled and fused button or insert, taken along the line 7—7 of Figure 6;

Figure 8 is a plan view of a bi-focal lens having a zonal insert constructed in accordance with the provision of my invention;

Figure 9 is a cross sectional view of the assembled and fused button, being placed over the countersink, preparatory to the fusing or heating process;

Figure 10 is an enlarged view of the zonal insert shown in Figure 4, together with construction line to facilitate the defining of the shape of the zonal insert;

Figure 11 is a modified arrangement of fusing a piece of flint glass with a straight edge to a piece of crown glass with a curved edge, and Figure 12 is a view similar to Figure 11, showing the two pieces of glass in Figure 11 as they will appear when fused.

With reference to the drawing, the reference character 15 represents a blank of crown glass having a countersink 16 which may be ground or otherwise provided therein, either on the outside or the inside in accordance with the usual construction of making countersinks. The blank piece of crown glass 15 may be referred to as the major lens. In the construction of bi-focal lenses having zonal inserts, a button or insert is placed over the countersink and fused therewith, after which the entire lens is re-shaped or ground to meet the accommodation of the particular user.

In accordance with the provisions of my invention, I utilize a fused button which comprises a piece of flint glass 22 having a curved top 24 and a bottom 25 which extends below and interconnects the two ends of the curve top 24, and a segmental piece of crown glass 23 having a curved bottom 26 adapted to match the curved top 24 of the piece of flint glass 22. After the piece of flint glass 22 and the piece of crown glass 23 are formed by suitable means, they are assembled, and then fused together in accordance with the usual practice in making fused buttons. When the two pieces are fused together, the button is shaped to fit over the countersink, see Figure 6. After the button is assembled and fused, as shown in Figure 6, it is placed over the countersink 16 and secured thereto by a spring clip 47, preparatory to the fusing operation, see Figure 9. When fusing the button into the countersink 16, the blank or major piece of crown glass 15 is placed in a tray 44 having a layer of carborundum 45 or other suitable material, upon which the major piece of crown glass 15 firmly and evenly rests to avoid any distortion of the blank 15 during the fusing operation. As illustrated in Figure 9, the fused button rests upon metal pieces 46 which may be arranged at various points around the countersink 16. These metal pieces 46 are employed so that during the fusing of the button to the countersink 16, the air which may be normally trapped therein can escape as the button fuses and drops down into the countersink. The metal pieces 46 are ground away during the refinishing or regrinding of the lens into their final shape.

In accordance with a principal object of my invention, the curved top 24 of the flint piece of glass 22 is made in accordance with the vision defined by the lower lid of the eye. In determining the shape of the curved top 24, I utilize a template 17 originally having a top edge 18 as shown in Figure 3. This template 17 is held at a distance from the eye, occupying substantially the same position as the flint zonal insert 22 will occupy when it is subsequently fused into the major piece of crown glass 15, and then the top edge is gradually cut away until a line is defined which coincides substantially with the vision of the lower lid of the eye. In Figure 3, the dotted line 19 designates the shape of the upper cut edge of the template 17 after it is cut to match the vision defined by the lower lid of the eye. In determining the shape of the upper edge 19 of the template 17, the eye is turned to the right and to the left as if looking through the same space which will subsequently be occupied by the flint piece of glass 22 when it is mounted into the crown piece of major glass 15. The central portion of the top 19 is slightly curved downwardly to match the vision defined by the downwardly curved central portion of the lower eye lid, and the opposite ends of top line 19 droop to match the vision defined by the opposite drooping ends of the lower eye lid, as the eye ball is turned to the extreme right and left.

The exact shape of the upper curved edge 19 of the template 17, or the shape of the top edge 24 of the flint piece of glass 22, may be better understood by referring to Figure 10, which shows an enlarged view of the flint piece of glass 22. The top line 24 has two spaced positive nodal points 30 and 31 and an intermediate negative nodal point 32. The lines 35 and 36 are drawn tangent to the intermediate curve portion of the line 24 and represent the maximum value of the slope of the curve top 24 intermediate the two spaced positive nodal points 30 and 31. Beginning at the intermediate negative nodal point 32, where the slope is zero, and extending outward in opposite directions, the slope of the curved top 24 intermediate the two positive nodal points 30 and 31 gradually increases in a positive direction. A positive slope is defined as one wherein an increase in the horizontal distance is accompanied by an increase in the vertical distance. The slope of the top line 24 becomes zero at the two positive nodal points 30 and 31 and then negative as each end of the top line extends to its terminus 33 or 34 where it intersects respectively the ends of the bottom line 25. The lines 38 and 39 are drawn tangent respectively to the left-hand end and the right-hand end of the curved top 34. These lines 38 and 39 designate the maximum negative slope of each end of the top line 24. Therefore, beginning at the intermediate negative nodal point 32, the top line 24 has a positive slope as it extends outwardly in opposite direction toward the two spaced positive nodal points 30 and 31 and has a negative slope as each end of the line extends beyond the positive nodal points 30 and 31 and intersect the bottom line 25 at the points of intersection 33 and 34. By comparing the angles defined by the lines 38 and 39, to the lines 35 and 36, it is noted that the rate of change of the negative slope as each end of the top line 24 extends beyond the two spaced positive nodal points 30 and 31, is greater than the rate of change of the positive slope of the top line 24 intermediate the two spaced positive nodal points 30 and 31.

The optical center of the flint insert 22 is designated by the point 41. In actual practice, the negative nodal point 32 of the top line 24 may be one-half of a millimeter or more below the level of the positive nodal points 30 and 31, and may coincide with the optical center 41. In positioning the flint piece of glass 22 upon the crown piece of major lens 15, the optical center 41 of the flint piece of glass 22 may be slightly below the optical center of the crown piece of major glass 15. In Figure 8, the optical center of the major piece of crown glass 15 is designated by the reference character 42. When using bifocal lenses constructed in accordance with my invention, the line of vision defined by the lower eye lid may assume various vertical elevational positions above and below the curved top 24 of the zonal insert 22, as the eye is vertically moved up and down and to the right and left while looking through the bifocal lens. Thus, if the eye is looking above the optical center 42 of the major lens 15, the line of vision defined by the lower eye lid may assume a position indicated by the dotted line 48. The line of vision, when passing through the optical center 42, may define a line designated by the reference character 49. And as the eye is lowered and approaches the top 24 of the insert 22, the line of vision may assume the position of the dotted line 50. As the eye is still further lowered the line of vision defined by the lower eye lid coincides substantially with the curve top 24 of the zonal insert 22. This means that the user of a bi-focal lens embodying the features of my invention may gradually lower the line of vision from the major lens and look through the zonal insert 22 without having any one entrant portion of the zonal insert 22 appear before any other portion of the zonal insert. Thus, the contour of the top edge of the zonal insert 22 provides an entrant field of vision with substantially every place along the curved top edge appearing substantially simultaneously as the vision of the eye passes from the major lens to the insert. In other words, the distance between the optical center 42 of the major lens 15 and the negative nodal point 32 on the top line 24 of the zonal insert 22 may be reduced to a minimum. Accordingly, if the user is looking through the optical center 42 of the major lens 15, he can with a very slight dropping of the eyes, look through the upper portion of the zonal insert 22 as designated by the dotted line 51.

Thus, a bi-focal lens embodying the features of my invention eliminate a great deal of stumbling. This is true, for the reason that the user can look, through the crown piece of major lens 15 and see at a distance to the ground without any interference of having his vision impaired, and yet be ever so close to the top edge 24 of the insert 22. There are no high places upon the top of the zonal insert 22 to impair the vision, as would be the case if the top 26 were not constructed in accordance with the vision defined by the lower lid of the eye, and thus, with the applicant's invention, the user does not have to bend his head down to see the ground to prevent stumbling. Also, in view of the fact that the negative nodal point 32 may be placed relatively close to the optical center 42 of the major lens 15, there is ample space below the zonal insert 22 to provide access for the user.

In Figures 11 and 12, I show a modified method of fusing the button. In this modified form the segmental piece of crown glass 23 is the same as that previously described, but the flint piece of glass is provided with a straight edge 53. In fusing the two pieces of glass 23 and 52, they are pressed together by any suitable tool or clamp. This causes the flint glass 52, which has a lower melting point than the piece of crown glass, to fit closely against the curved edge of the crown piece of glass 22. This method obviates the necessity of forming the top edge of the flint piece of glass to match the lower edge 26 of the crown piece of glass as previously described.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An insert for a major lens comprising a piece of glass having a different refractive index from that of the major lens, said insert being defined by a bottom edge and a curved top edge extending transversely of the major lens, said bottom edge having its ends extending upwardly and interconnecting the ends of the top edge, said top curved edge having two spaced positive nodal points located relatively far apart and an intermediate negative nodal point, each of said spaced positive nodal points being located relatively close to the interconnection of each end of the top edge with each end of the bottom edge, the top edge between each of said positive nodal points and the adjacent relatively close interconnection of the end of the top and the bottom edge being curved downwardly in a short arc, the top edge between the two spaced positive nodal points being concaved slightly downwardly with respect to a line contacting the two spaced positive nodal points and forming a low flat arc which passes through the intermediate negative nodal point, the contour of said top edge being thus formed to provide an entrant field of vision with substantially every place along the curved top edge appearing substantially simultaneously as the vision of the eye passes from the major lens to the insert.

2. An insert for a major lens comprising a piece of glass having a different refractive index from that of the major lens, said insert being defined by a bottom edge and a curved top edge extending transversely of the major lens, said bottom edge having its ends extending upwardly and interconnecting the ends of the top edge, said top curved edge having two spaced positive nodal points located relatively far apart and an intermediate negative nodal point, each of said spaced positive nodal points being located relatively close to the interconnection of each end of the top edge with each end of the bottom edge, the top edge between each of said positive nodal points and the adjacent relatively close interconnection of the end of the top and the bottom edge being curved downwardly in a short arc, the top edge between the two spaced positive nodal points being concaved slightly downwardly with respect to a line contacting the two spaced positive nodal points and forming a low flat arc which passes through the intermediate negative nodal point, the said negative nodal point being above the said interconnections of the ends of the top and the bottom edge, and the contour of said top edge being thus formed to provide an entrant field of vision with substantially every place along the curved top edge appearing substantially simultaneously as the vision of the eye passes from the major lens to the insert.

3. In a method of constructing an insert for insertion in a countersink of a major lens to produce a bifocal lens as set forth which comprises providing a member with a curved edge having an intermediate negative nodal point and two spaced positive nodal points located relatively far apart and relatively close to the respective ends of the curved edge, the end portions of the curved edge beyond the positive nodal points being curved downwardly in short arcs and the portion of the curved edge between the two spaced positive nodal points being concaved slightly downwardly with respect to a line contacting the two spaced positive nodal points and forming a low flat arc which passes through the intermediate negative nodal point, shaping the top edge of the insert having a different refractive index from that of the major lens in substantial accordance with the established curved edge, fusing in the countersink the said insert and a second piece of glass of substantially the same refractive index as that of the major lens to make the junction line between the different refractive portions correspond substantially to the established curved edge.

4. In a method of constructing an insert for insertion in a counter-sink of a major lens to produce a bi-focal lens as set forth which comprises providing a member with a curved edge having an intermediate negative nodal point and two spaced positive nodal points located relatively far apart and relatively close to the respective ends of the curved edge, the end portions of the curved edge beyond the positive nodal points being curved downwardly in short arcs and the portion of the curved edge between the two spaced positive nodal points being concaved slightly downwardly with respect to a line contacting the two spaced positive nodal points and forming a low flat arc which passes through the intermediate negative nodal point, shaping the top edge of the insert having a different refractive index from that of the major lens in substantial accordance with the established curved edge, providing a piece of glass of substantially the same index of refraction as the major lens and shaping an edge portion thereof complementary to the said top edge of the insert, fusing said complementary edges together to form a fused unit, with the junction line therebetween corresponding substantially to the established curved edge, and fusing the said unit in the countersink of the major lens to produce the bi-focal lens.

DAVID SLOTSKY.